United States Patent Office 2,726,965
Patented Dec. 13, 1955

2,726,965
ULTRAMARINE BLUE ENAMEL PIGMENT

George W. Cressman, Cleveland, and William E. Kotsch and Carl Severin, Cleveland Heights, Ohio, assignors to General Electric Company, a corporation of New York; patent dedicated to the Public insofar as it relates to lamps and lamp parts to the extent stated in document recorded in the United States Patent Office, January 4, 1955, liber U–238, page 394

No Drawing. Application November 1, 1951,
Serial No. 254,456

1 Claim. (Cl. 106—48)

The present invention relates to vitreous enamels and more particularly to pigments for such enamels.

Cobalt has been used heretofore in vitreous enamels as a blue colorant but has not been entirely satisfactory because of the poor color characteristics with regard to transmitted light and because of the high absorption of infra red energy by vitreous enamels incorporating cobalt as a colorant.

The principal object of the present invention is to provide an inexpensive blue pigment for vitreous enamels having satisfactory transmission characteristics for blue colored light and for infra red radiation. Another object of the invention is to provide a vitreous enamel incorporating a blue pigment for coating glass electric lamp bulbs. Further objects and advantages of the invention will appear from the following description.

We have found that ultramarine blue pigment is a satisfactory blue pigment for low temperature glazing vitreous enamels free from lead and containing also titanium dioxide in an amount sufficient to produce a light diffusing effect in the enamel coating on a glass electric lamp bulb.

A vitreous enamel incorporating ultramarine blue pigment as a colorant may be prepared by first making a frit having the following batch composition:

| | Parts by weight |
|---|---|
| $SiO_2$ | 8.5 |
| Feldspar | 17.0 |
| $TiO_2$ | 3.0 |
| ZnO | 29.5 |
| $CaF_2$ | 6.0 |
| $KNO_3$ | 6.0 |
| $H_3BO_3$ | 40.0 |
| $As_2O_3$ | 3.5 |
| $BaCO_3$ | 5.0 |
| $K_2CO_3$ | 5.0 |
| $Na_2CO_3$ | 4.0 | and the following theoretical oxide composition:

| | Percent |
|---|---|
| $SiO_2$ | 20.11 |
| $Al_2O_3$ | 2.85 |
| $B_2O_3$ | 22.14 |
| $Fe_2O_3$ | 0.03 |
| CaO | 0.13 |
| MgO | 0.02 |
| $Na_2O$ | 5.27 |
| $K_2O$ | 4.28 |
| $As_2O_3$ | 3.44 |
| ZnO | 29.03 |
| $CaF_2$ | 5.91 |
| BaO | 3.83 |
| $TiO_2$ | 2.96 |

The frit is prepared by first mixing the raw materials and placing the batch mixture in containers free from all contamination. The batch is then placed in a furnace, either of the continuous or pot type, and smelted at a temperature of approximately 1200 to 1300° C. until fluid enough to flow through the flow block of the tank, for example. The smelted batch is then discharged from the furnace into cold water to break it up and obtain the frit which is then placed in metal trays to dry.

In preparing the enamel the ultramarine blue pigment, which, in one suitable form, has the molecular formula $Na_4 (NaS_3.Al) Al_2 (SiO_4)_3$, and the titanium dioxide are ball milled with the frit and a suspension vehicle until a thorough mixture and a suitable particle size of the solid ingredients has been attained.

An eminently satisfactory light-diffusing blue enamel highly transmissive of infra red energy is obtained by the addition to 200 grams of the lead-less frit disclosed above of 40 grams of ultramarine blue pigment and 2 to 5 grams of titanium dioxide. These materials are placed in a ball mill with 175 cc. of alcohol and the mill is rotated at about 60 revolutions per minute for a period of about 24 hours. The milled batch may be thinned further with alcohol or other suitable vehicles, when desired, before applying the enamel to the surface of a glass electric lamp bulb which may be done by dipping, spraying or painting.

The enamel coating is dried and then glazed on the bulb by heating in air for a period of about 3 minutes at an oven temperature of about 720° C.

What we claim as new and desire to secure by Letters Patent of the United States is:

A vitreous enamel for coating glass electric lamp bulbs and consisting essentially of a frit having the following composition in percentages by weight:

| | Percent |
|---|---|
| $SiO_2$ | 20.11 |
| $Al_2O_3$ | 2.85 |
| $B_2O_3$ | 22.14 |
| $Fe_2O_3$ | 0.03 |
| CaO | 0.13 |
| MgO | 0.02 |
| $Na_2O$ | 5.27 |
| $K_2O$ | 4.28 |
| $As_2O_3$ | 3.44 |
| ZnO | 29.03 |
| $CaF_2$ | 5.91 |
| BaO | 3.83 |
| $TiO_2$ | 2.96 | and ultramarine blue pigment having the molecular formula $Na_4 (NaS_3.Al) Al_2 (SiO_4)_3$ in an amount of about 20 per cent by weight of the frit and titanium dioxide as a diffusing material in an amount of about 1 to 2½ per cent inclusive by weight of the frit.

References Cited in the file of this patent

"Chemical Synonyms and Trade Names" by Gardner, pub. by The Industrial Book Co., Inc., N. Y, 1930, pages 335 and 349.

Dana's "Textbook of Mineralogy," 4th ed., pub. by John Wiley & Sons, 1932, page 590.

"The Porcelain Enamel and Ceramic Color Industry in Germany" by C. J. Harbert, Fiat Final Report No. 794, July 9, 1946, pub. by the U. S Dept. of Commerce, pages 48 and 49.